United States Patent [19]
Weber

[11] Patent Number: 5,167,689
[45] Date of Patent: Dec. 1, 1992

[54] PROCESS FOR BENDING GLASS SHEETS

[75] Inventor: M. Frederic Weber, Compiegne, France

[73] Assignee: Saint-Gobain Vitrage International C/O Saint-Gobain Recherche, Aubervilliers, France

[21] Appl. No.: 672,336

[22] Filed: Mar. 20, 1991

[30] Foreign Application Priority Data

Mar. 20, 1990 [FR] France ................................ 90 03513

[51] Int. Cl.[5] ........................................... C03B 23/023
[52] U.S. Cl. ......................................... 65/106; 65/107
[58] Field of Search .................................. 65/107, 106

[56] References Cited
U.S. PATENT DOCUMENTS 4,074,996  2/1978  Hagedorn et al. ..................... 65/106
4,286,980  9/1981  Matsuzaki et al. .................... 65/106

Primary Examiner—Joye L. Woodard
Attorney, Agent, or Firm—Oblon, Spivak, McClelland, Maier & Neustadt

[57] ABSTRACT

A process and a device for the bending on a frame of at least one glass sheet by gravity, the bending being performed in at least two stages during which the glass sheet or sheets undergo a deformation by gravity. In a first stage, the glass sheet or sheets are bent according to a first shape corresponding to a blank or precursor of the final shape. In a second stage, the glass sheet or sheets are bent according to the final shape. The device includes a frame 1 of which at least one part has two elements, one element forming a blank frame (2, 3, 4, 5) and another element forming a final frame (2, 3, 12, 13).

6 Claims, 6 Drawing Sheets

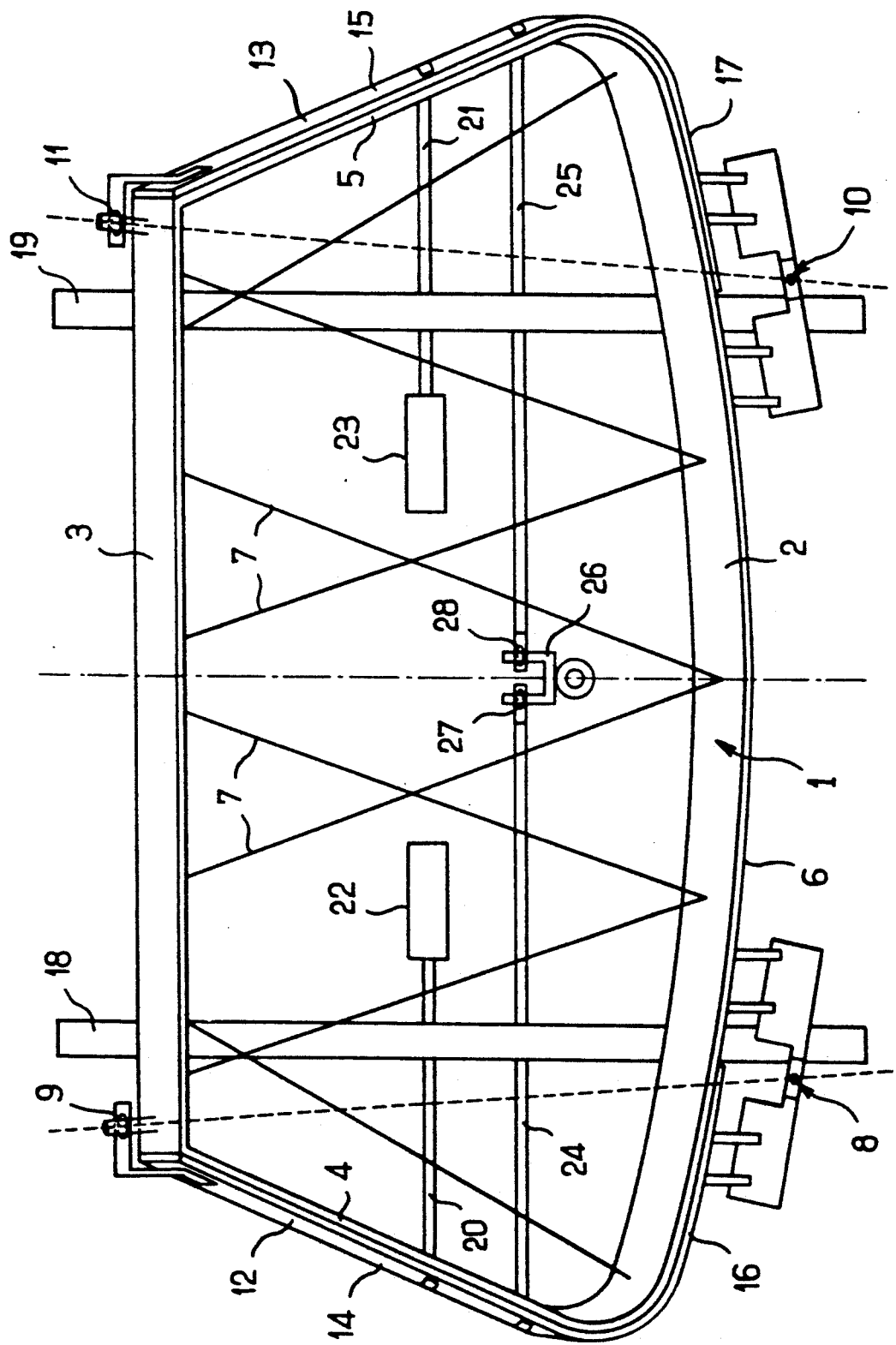
FIG_1

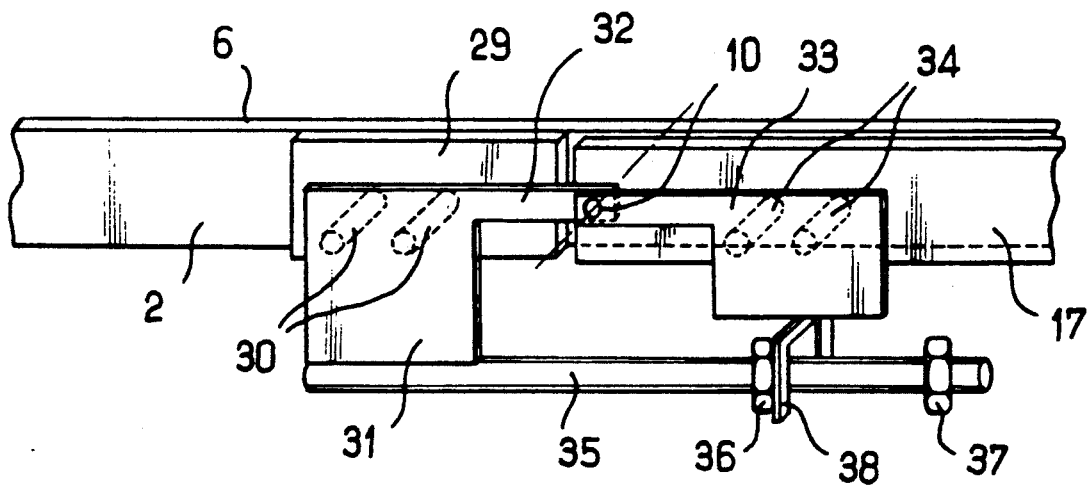
FIG_2a
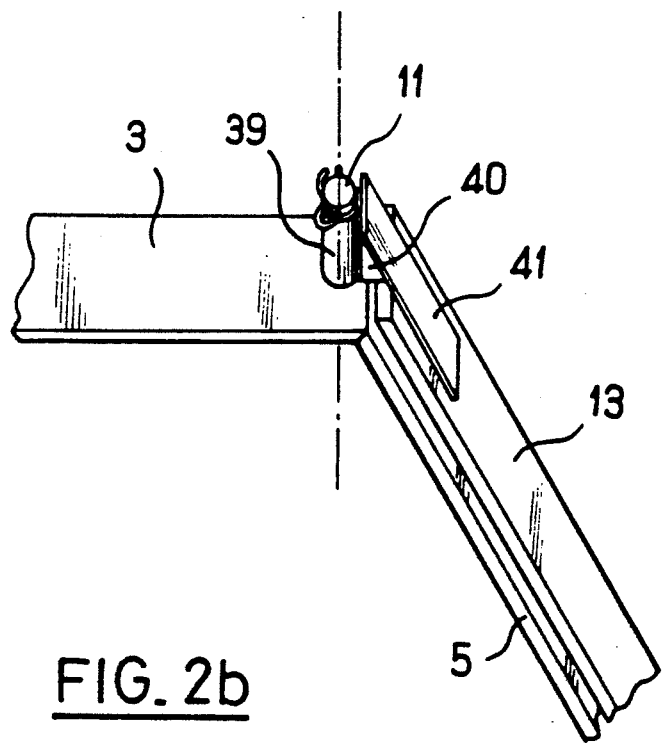
FIG_2b

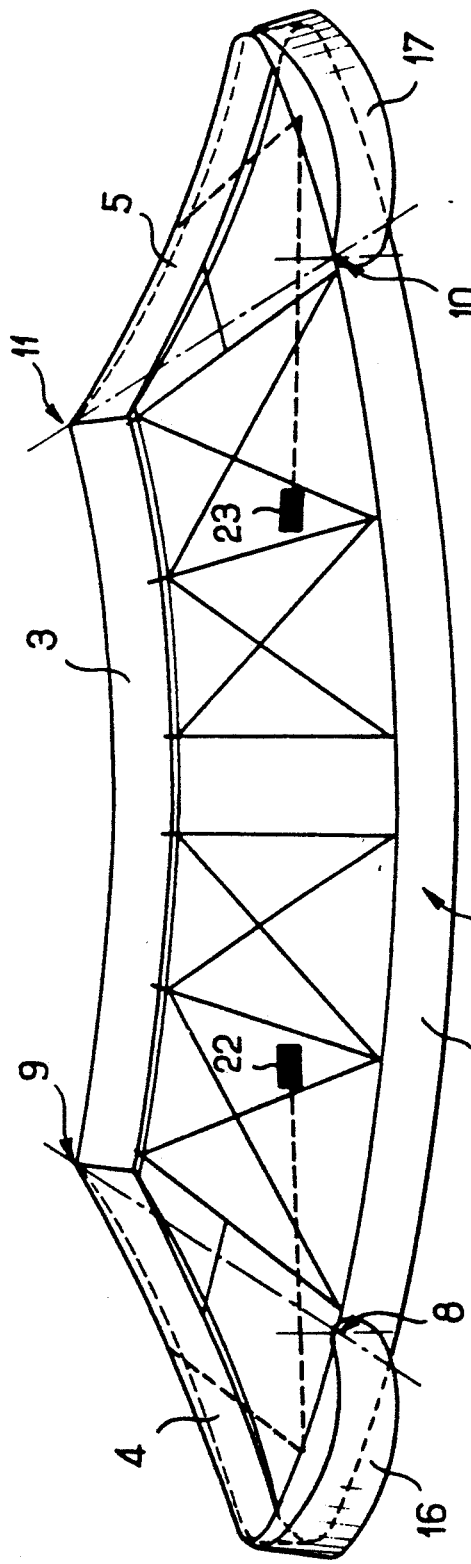
FIG_3
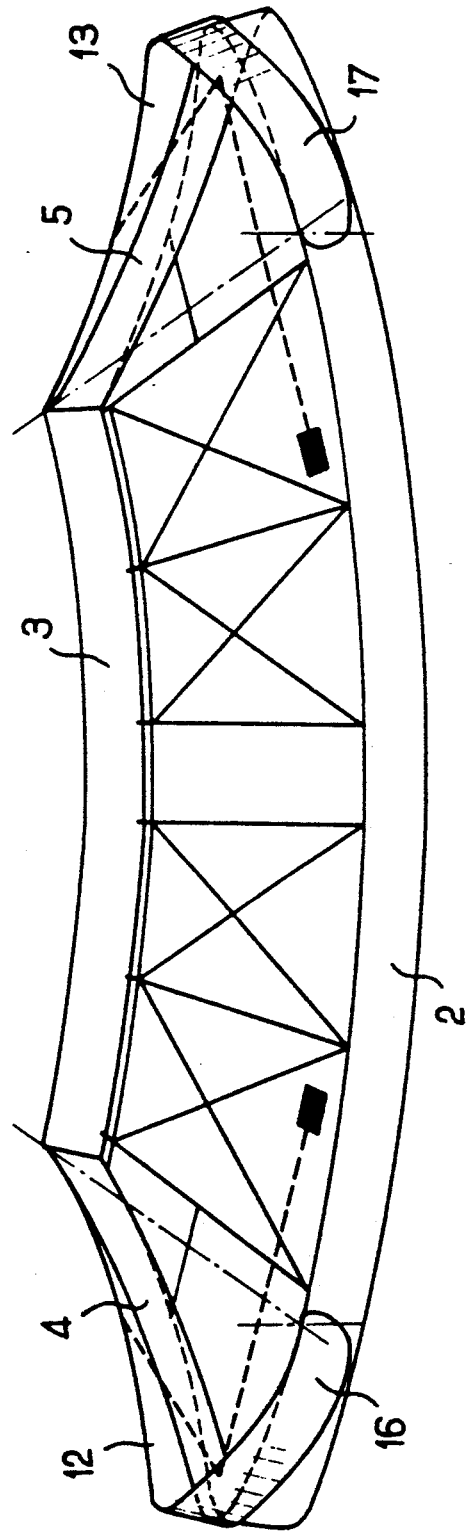
FIG_4

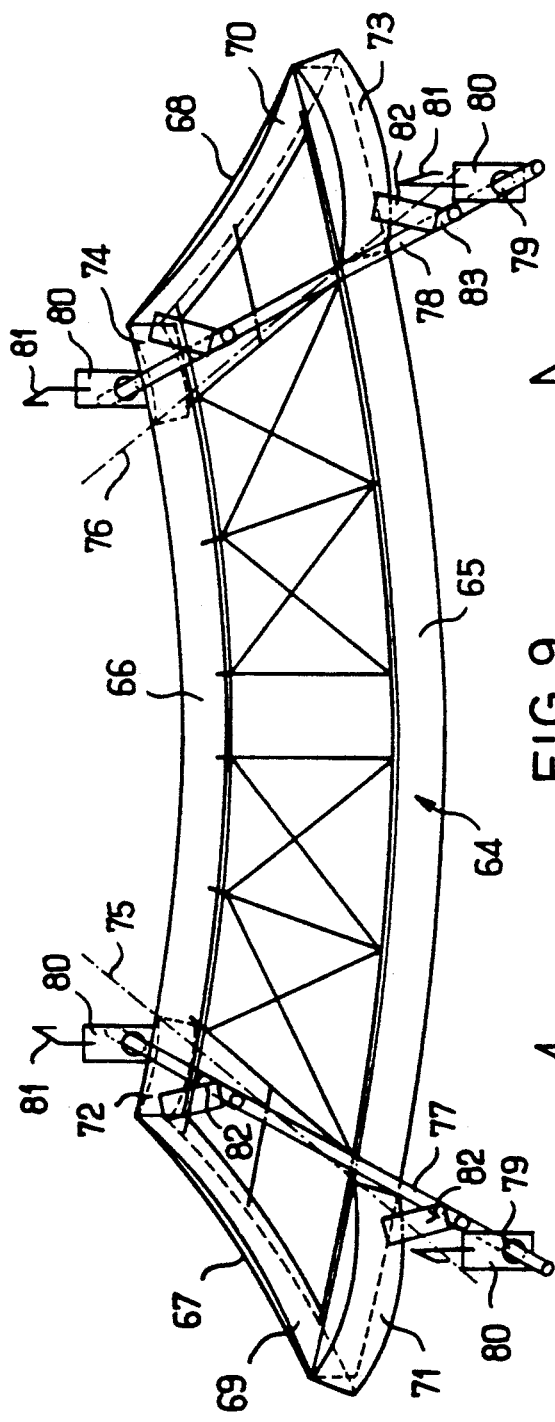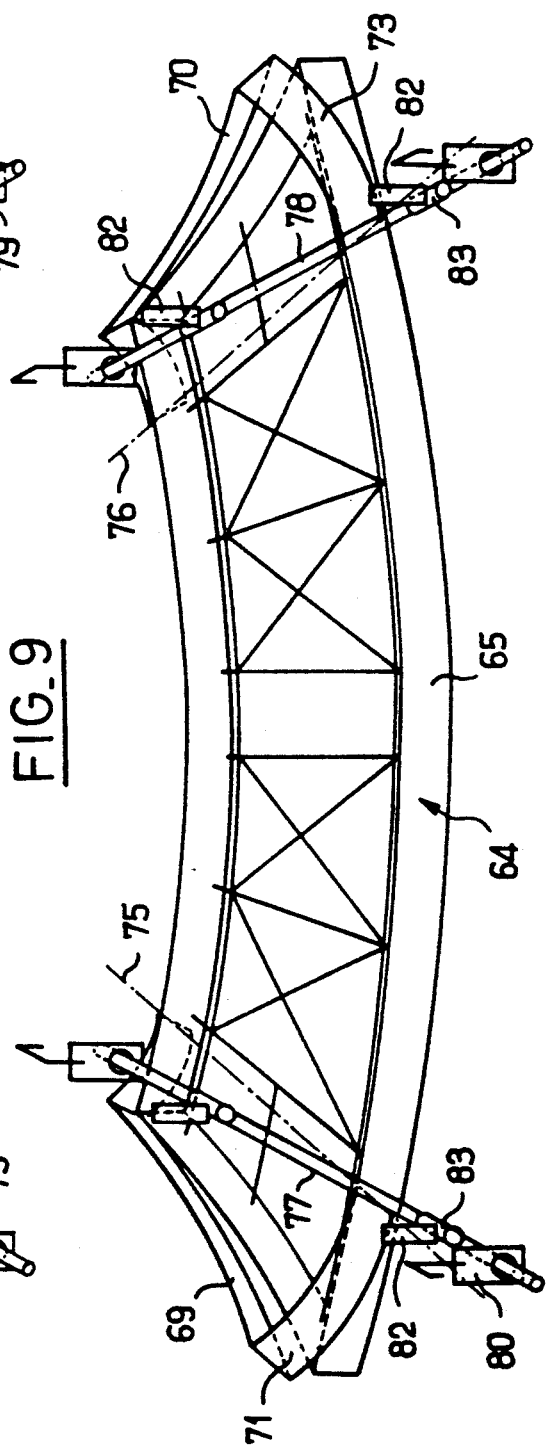

PROCESS FOR BENDING GLASS SHEETS

BACKGROUND OF THE INVENTION

1. Field of the Invention

This invention relates to bending glass sheets and in particular bending on a bending shape or hollow configuration ordinarily designated as a frame or bending skeleton.

2. Description of the Related Art

The bending of glass sheets on a skeleton is a technique ordinarily used to bend glass sheets and in particular to bend simultaneously the two glass sheets intended to form a bent laminated glazing such as a transport vehicle windshield. In this technique, the two glass sheets laid on one another with insertion of a suitable separating agent are supported along their margins in an approximately horizontal orientation by a frame having the desired profile, i.e., a profile corresponding to the final one of the two bent glass sheets. Thus supported, the two glass sheets go into a bending furnace, generally a furnace having zones of different temperatures.

The first of these zones is a preheating zone in which the glass sheets are heated to a temperature of the glass close to the softening point. The next zone is the bending zone where the glass sheets brought to a temperature of about 600° C. will gradually be bent by gravity to assume finally the shape of the frame. The glass sheets are then cooled and removed from the bending frame at the output of the tunnel furnace.

This bending process on a skeleton is fully satisfactory when the curves are not very pronounced and/or when the bending is essentially cylindrical. When the curves are more pronounced, and in particular in the vicinity of the periphery of the glazings, what is called a counterbending can occur at the corners of the glass sheets, generally at two of these corners, or even at the four corners according to the geometry of the glazing, i.e., its curves and also its cutout shape. The counterbending corresponds to an undesired inversion of the curve.

The bent glass sheets obtained then no longer meet the requirement imposed on the glazing to be able to be mounted in a car body window opening.

To eliminate the counterbending, in the case of the bending of a single glass sheet intended to be tempered thermally and which for this purpose is greatly heated, it has already bee proposed to hold the edges of said sheet during the bending operation. This process is not entirely satisfactory, in particular in the case of the bending of several glass sheets simultaneously.

SUMMARY OF THE INVENTION

It is an object of the present invention to provide a process and a device which overcomes the above-mentioned drawbacks, making it possible to eliminate the counterbending, in particular during the bending of two glass sheets simultaneously.

The use of a force in addition to the force of gravity being applied on the upper face of the glass sheet from above the locations subject to a counterbending has been proposed in the publication of European patent EP-A-0 250 311. This process is satisfactory for a large number of glazing shapes. Nevertheless, it cannot be used for all glazing shapes subject to an undesired counterbending during their passage in the bending furnaces by gravity. Further, it is necessary to eliminate the contact of the force applying element during the homogenizing of temperatures in the last phase of the bending process by gravity.

The invention prevents the drawbacks cited. It proposes a new process of bending by gravity of one or more glass sheets simultaneously, making it possible to eliminate the counterbending, which leaves no mark on the visible part of the glass sheet or sheets and which further makes possible a good homogenizing of the temperature of the glass sheets after the bending itself.

The process of bending at least one glass sheet by gravity and according to the invention comprising at least two stages or steps for the bending itself during which the glass sheet or sheets undergo a modification of their shape by gravity by being supported on their periphery: a first stage during which the glass sheet or sheets are bent by gravity according to a first shape corresponding to a precursor of the final shape, then a second stage during which the glass sheet or sheets are bent by gravity according to the final shape.

According to one aspect of the invention, the first bending stage consists in bending essentially along a first curve corresponding generally to the crosswise curve to be imparted to the glass sheet or sheets, without significant modification of a second curve corresponding to the desired longitudinal curve of the glass sheet or sheets, and the second stage consists in ending the bending along the first curve and essentially producing the second curve.

By providing a first stage according to a desired profile in the glass sheet or sheets, the undesired counterbending is thus avoided.

According to another aspect of the invention, the first bending stage consists in essentially bending along the crosswise curve and along a longitudinal curve in the median part of the glass sheet or sheets, and the second bending stage consists in an additional bending which is essentially longitudinal and located on the peripheral parts of the glass sheet or sheets.

According to the process of the invention, the first bending stage is achieved by supporting the glass sheet or sheets along a first peripheral line which, if necessary, can vary during the first stage, and the second bending stage is achieved by supporting the glass sheet or sheets along a second peripheral line of a different curve which is substitute for the first. The two peripheral lines are completely distinct from one another, one being placed inside the other. The substitution of one line by the other is performed either by an elevation of the level of the second line relative to the level of the first line, or by a lowering of the level of this first line.

According to another form of use of the process, this second peripheral line is distinct only in parts from the first line. The distinction or difference can relate to the lateral parts of the two lines.

In this case, the difference generally consists in the lateral parts of the second line having more pronounced curves and being placed at a level higher than the level of the lateral parts of the first line.

The peripheral lines according to the invention are generally continuous lines, in particular for the line defining the final bent shape of the glass sheet or sheets, although a line formed by several segments placed in suitable locations can also be suitable, in particular for the line defining the precursor.

According to an aspect of the invention, the first peripheral line intended for the achievement of the first bending stage is such that the angle formed by any vector tangent to said line with the horizontal plane is less than 20 degrees and preferably less than 15 degrees.

The invention also relates to a device for the bending by gravity of one or more stacked glass sheets and in particular a novel bending frame.

The bending frame according to the invention comprises a peripheral strip of which at least one part is doubled by comprising two elements, one element forming a so-called blank frame and being used to support the periphery of the glass sheet or sheets to be bent during the first bending stage consisting in forming a blank or precursor shape, and a second element forming a so-called final frame being substituted for the first and being used to support the periphery of the glass sheet or sheets during the second bending stage to arrive at the final shape.

According to an embodiment of the device according to the invention, the doubled part can extend over the entire periphery of the frame.

According to another embodiment of the device, the doubled part is limited to the two lateral parts of the frame.

In an embodiment of the device according to the invention, the latter consists of a stationary blank frame on which are mounted and jointed at the desired locations, in particular on the two lateral parts, pivoting elements able to occupy two positions, a first so-called rest or retracted position, these pivoting elements being placed at a lower level than the lateral parts of the stationary frame, and a second so-called work position, when these elements are substituted for stationary lateral parts to support the sheets to be bent along a peripheral line located at a higher level than the level of the stationary lateral parts, thus to form a final frame. Means making possible the pivoting of the pivoting elements are provided. These means can be a weight system kept locked in one position and unlocked at the desired time, or any other suitable system, in particular a system using the weight of the frame itself.

In a variant, the blank frame exhibits a pivoting part which, in work position, is placed at a higher level than that of the stationary final frame in this variant, and which is lowered in rest position to a lower level than that of the acting part of the final frame.

According to another variant of the device, the blank frame and the final frame both exhibit pivoting parts.

The blank frame can exhibit pivoting parts which pivot as the formation of the blank proceeds. In this case, the first peripheral line of bending that was defined above according to the invention as being the line of the support of the glass sheet or sheets for the formation of the blank is a line whose shape varies as the formation of the blank proceeds. Generally, the pivoting parts of the blank frame are the lateral parts which then carry the pivoting lateral crossbeams intended to form the final frame.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows an embodiment of a device or bending frame in a perspective view;

FIGS. 2a and 2b show the mounting of the frame pivoting part shown in FIG. 1;

FIG. 3 schematically shows the arrangement of the bending frame of FIG. 1 during the first bending stage;

FIG. 4 schematically shows the arrangement of the bending frame of FIG. 1 during the second bending stage;

FIG. 9 schematically shows a variant of a device able to be used for the bending of a glazing subject to the counterbending close to its four corners; and FIG. 10 schematically shows the device of FIG. 9 in its configuration corresponding to the second bending stage.

DETAILED DESCRIPTION OF THE PREFERRED EMBODIMENTS

Figure 5:
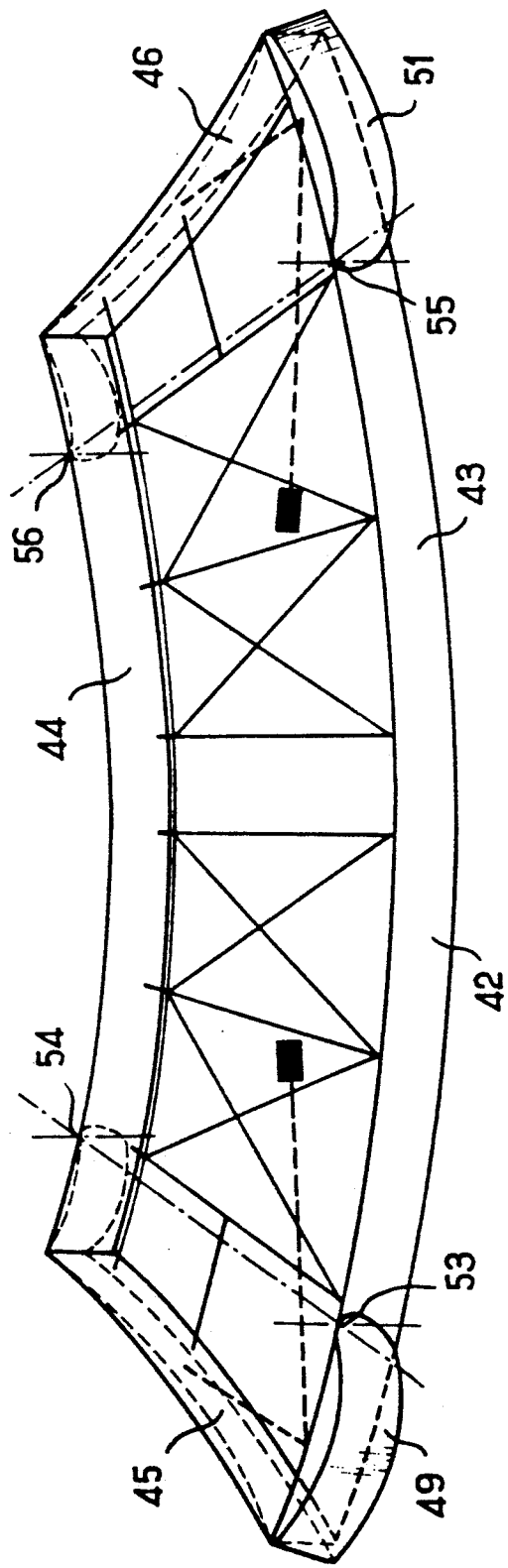
FIG. 5 schematically shows an embodiment of a device able to be used for the bending of a glazing subject to the counterbending close to its four corners.

The device shown in FIG. 1 comprises a stationary frame 1 placed horizontally, comprising two longitudinal parts or beams 2, 3 and two crosswise parts or end crossbeams 4, 5. It can be noted that longitudinal beam 2 shown here exhibits a relatively pronounced curve line (projecting in the horizontal plane), which corresponds to a shape of glazings particularly subject to the counterbending close to the two lower corners. Upper edge 6 of the stationary frame constitutes the bending line which corresponds to the blank shape for the glass sheets to be bent. This stationary frame is the blank frame. Longitudinal beams 2, 3 and crossbeams 4, 5 are connected by braces 7 which assure the rigidity of the system. Close to their ends, as described later, the two longitudinal beams 2, 3 carry essentially horizontal pins 8, 9, 10, 11 (pins 8 and 9 being aligned here, likewise for two pins 10 and 11) around which are mounted or jointed two pivoting crossbeams 12, 13, which together exhibit a profile corresponding to the final profile desired for the lateral parts of the sheets to be bent. A mounting of a pivoting crossbeam is represented in FIGS. 2a and 2b, described later.

The two pivoting crossbeams 12, 13 are each formed by a crosswise part 14, 15 relative to the frame and a flange 16, 17, which joins longitudinal beam 2. The curves of these pivoting crossbeams 12, 13 correspond to the final bending profile as described later. These curves are therefore more pronounced than the curves of the stationary crossbeams of the frame.

The two pivoting crossbeams 12, 13 can occupy two positions as shown schematically in FIGS. 3 and 4. A first position, which is that shown in FIGS. 1 and 3, is the so-called rest position or retracted position relative to stationary frame 1, in particular relative to stationary lateral crossbeams 4, 5 of this frame. The second position shown in FIG. 4 is the work position. In this case, the profile of the upper edge of pivoting crossbeams 12, 13 regularly lengthens the upper edge of longitudinal beams 2, 3 along a curve tangent to the curve of these longitudinal beams 2, 3, the unit forming the final peripheral bending line.

Two rails 18, 19 provided under the stationary frame make possible the mounting of the bending frame on a carriage, not shown, which conveys the frame into the bending furnace in a known way.

Arms 20, 21, which come back under the frame and which carry weights 22, 23, are attached to the center of two pivoting crossbeams 12, 13. When they are free to act, these weights 22, 23 hold the two pivoting crossbeams 12, 13 in the final bending position, i.e., at a higher level than that of stationary crossbeams 4, 5. Two rods 24, 25 belonging to a system making it possible to lock and to release the action of the weights are also mounted on two pivoting crossbeams 12, 13. The two rods 24, 25 can be connected by a yoke 26 which is placed in two end eyes 27, 28, carried by rods 24, 25, when pivoting crossbeams 12, 13 are in the low or retracted position.

The mounting of the pivoting crossbeams is designed so that the pivoting crossbeams double or correspond to the stationary crossbeams in the closest possible way, i.e., so that the peripheral line of contact between these pivoting crossbeams at their retracted position and the glass sheet is as close as possible to the line of contact between the stationary crossbeams and said glass sheet.

In FIG. 2a, a detail of the mounting of flange 17 of a pivoting crossbeam 13 on front longitudinal beam 2 of stationary frame 1 is shown. The stationary frame equipped with a reinforcement 29 integrally carries, at the end of two rods 30, a plate 31 exhibiting an arm 32 whose end carries a pin 10 around which can pivot another plate 33 held by two rods 34 attached to flange 17 of pivoting crossbeam 13. Pivoting pin 10 is located at the level of upper edge 6 of the stationary frame.

Plate 31 also carries a threaded rod 35 on which are placed two nuts 36, 37 in suitable locations which delimit the amplitude of the pivoting movement of the crossbeam, in cooperation with a stop 38 carried by plate 33 integral with the pivoting crossbeam.

In FIG. 2b, the mounting of the crossbeam on rear longitudinal beam 3 of stationary frame 1 has been shown. The end of the longitudinal beam carries a pin 11 around which a sleeve 39, integral with pivoting crossbeam 13 by a bracket 40 and a plate 41, is mounted to rotate.

The operation of the device is now described in relation to FIGS. 3 and 4. This device is used for the bending of two glass sheets intended to be used to produce laminated glazings, for example, a motor vehicle windshield. The bent glazing to be produced is such that when it is placed in a horizontal position, a vector tangent to the lateral end of the widest part of the glazing forms an angle of about 45 degrees with the horizontal plane.

In FIG. 3 the device is in its position in which the pivoting crossbeams are retracted. Holding of this position is assured by yoke 26 which connects the two rods 24, 25.

The two glass sheets are placed on the frame and centered, for example, by rollers (not shown) placed on the circumference of the frame. The lower glass sheet (not shown) rests at various points on the frame at about 5 mm from its edge. At the corner of longitudinal beam 2 and crossbeam 4, the angle formed by a vector tangent to the upper edge of the stationary frame with a horizontal plane is about 15 degrees.

The device is then brought into the bending furnace. In a first phase, the unit undergoes a preheating. Then, in a second phase which brings the glass to, and maintains it at, a temperature on the order of about 600° C., the glass sheets sag by gravity and rest on the circumference of the stationary frame mainly on the central parts of longitudinal beams 2, 3, thus taking the shape of a blank or precursor of the final curves to be obtained. This blank shape exhibits a crosswise curve close to the final crosswise curve. When this blank shape is obtained, yoke 26 which integrates the two rods 24, 25 is removed via suitable means, and the two weights 22, 23 are thus released. The weights cause the pivoting of two pivoting crossbeams 12, 13 which raises the pivoting crossbeams such that they support the glass sheets along a peripheral line which is very close to, and offset on the outside by a minimal distance, from the first peripheral line formed by the stationary lateral parts.

This minimal distance generally corresponds to the thickness of the pivoting crossbeams plus the play necessary for the very close correspondence of the pivoting crossbeams with the stationary crossbeams. The two lines of peripheral support for the crosswise parts are thus very close and both are very close to the edge of the lower sheet. The two close peripheral marks can thus be in the zone covered by the seal used for the mounting of the glazing in the car body window opening and are therefore invisible on the mounted glazing.

When the two pivoting parts are substituted for the stationary parts as a peripheral support of the glass sheets, the device is then in the configuration shown in FIG. 4. Flanges 16, 17 of the pivoting part thus lengthen the central parts of two longitudinal beams 2, 3 along a regular line corresponding to the final curve desired for the glass sheets. The median zone of the pivoting parts exhibits a crosswise final curve which is more pronounced than the curve exhibited by the stationary crossbeams of the frame.

The additional bending is thus initiated to obtain the final curve of the glass sheets.

When the final shape is obtained, the unit is subjected to a homogenizing of the temperatures. Then the device is removed from the bending furnace.

The two glass sheets are removed from the bending frame and can be used for the production of a laminated sheet by an inserted sheet of polyvinyl butyral, for example, one inserted between them.

Figure 6:
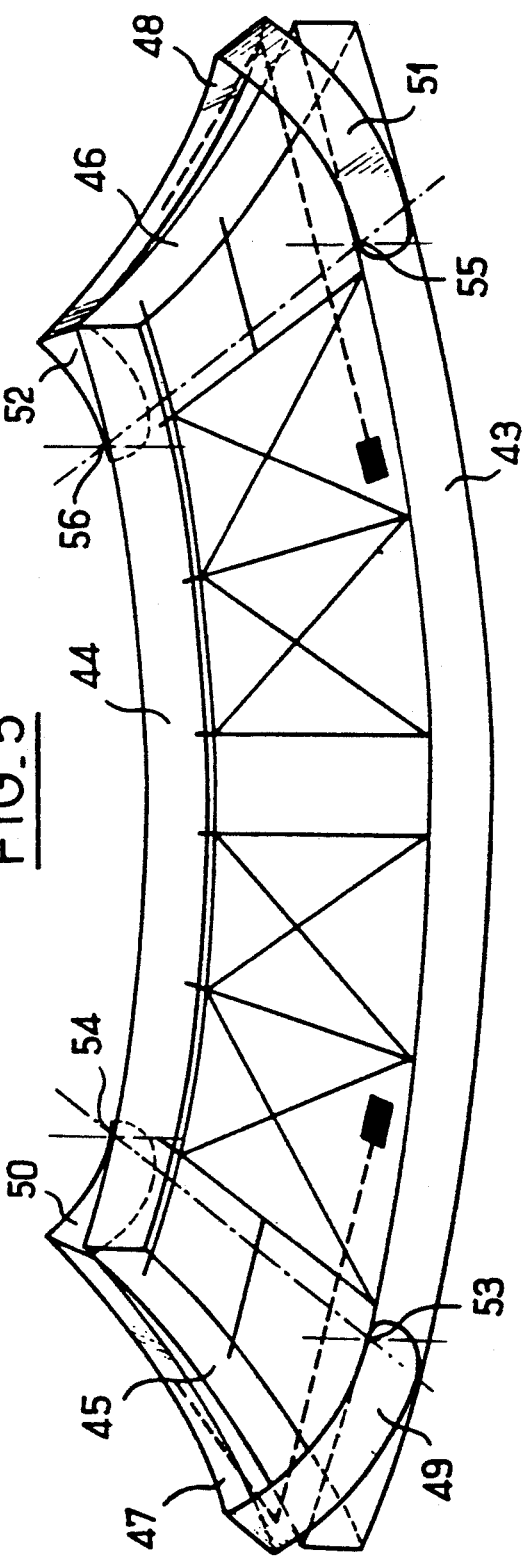
FIG. 6 schematically shows the configuration of the bending device of FIG. 5, adopted during the second bending stage.

In FIGS. 5 and 6, a device able to be used for the bending of a glazing subject to counterbending close to its four corners has been shown. This device according to the invention essentially comprises the same elements as those described above, except concerning its lateral parts. Thus, the device comprises a stationary frame 42 formed by two longitudinal beams 43, 44 and two end crossbeams 45, 46. Its pivoting crossbeams 47, 48 each exhibit here two flanges 49, 50, 51, 52 which are mounted to pivot around horizontal pins 53, 54, 55, 56 as in the preceding device for the mounting of pivoting crossbeams 12, 13 on front longitudinal beam 2.

The operation of this device is analogous to that described above. The glass sheet or sheets are placed horizontally on the stationary frame while the device is in position according to FIG. 5. The first bending stage obtaining the blank shape takes place on the stationary frame. The second bending stage obtaining the final shape is performed while the device is in the configuration according to FIG. 6. The passage from one configuration to another is performed as above by the action of weights 22, 23 and a system of locking and unlocking with rods and a yoke (not shown).

Figure 7A:
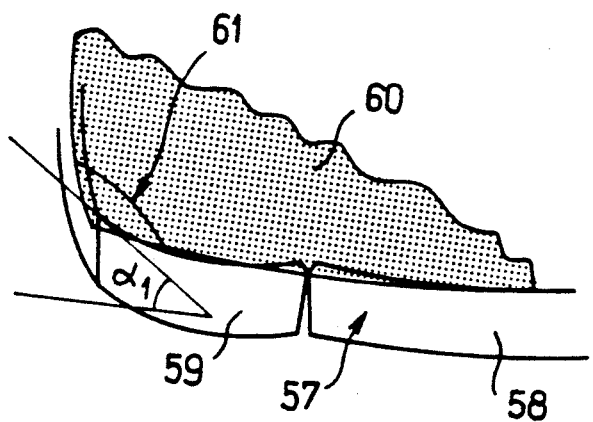
FIGS. 7a, 7b and 7c schematically show the evolution of the bending of a glass sheet on a standard known bending frame.
Figure 8A:
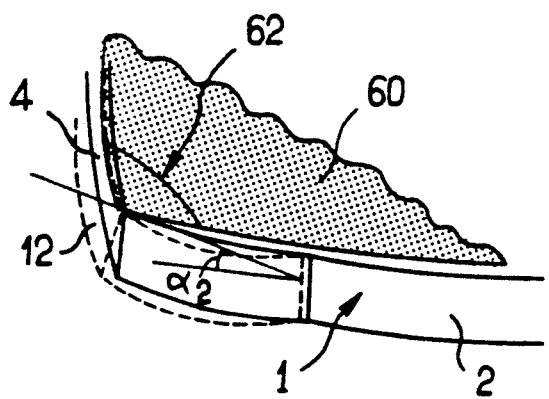
FIGS. 8a, 8b and 8c schematically show the evolution of the bending of a glass sheet on a bending frame according to the invention.
Figure 7B:
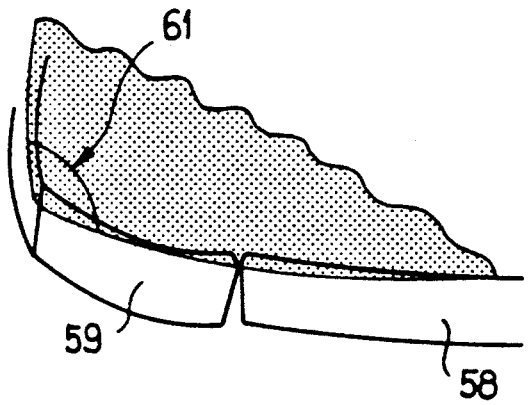
Figure 8B:
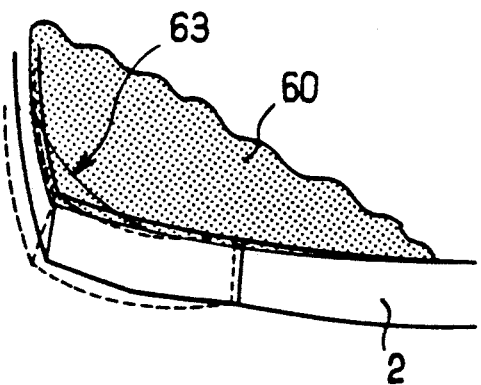
Figure 7C:
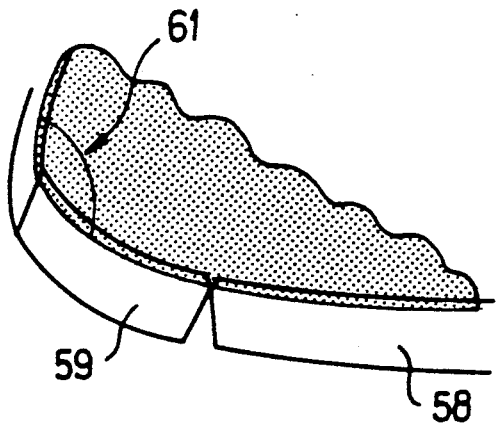
Figure 8C:
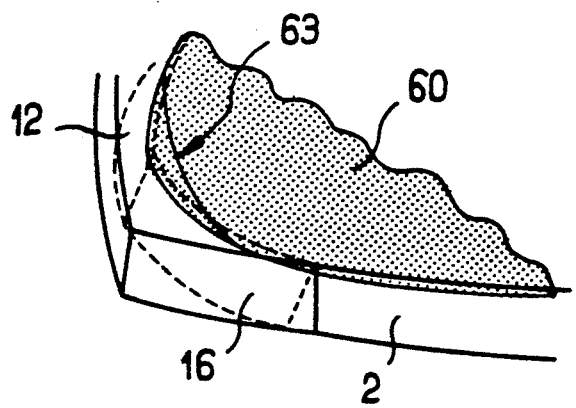

With the help of FIGS. 7a, 7b, 7c and FIGS. 8a, 8b, 8c, the differences in the evolution of the bending of one glass sheet or of two glass sheets, according to which a known bending frame is used as shown in FIGS. 7a, 7b, 7c or a bending frame according to the invention as shown in FIGS. 8a, 8b, 8c, have been shown.

In standard skeleton 57, which is a jointed skeleton here with a stationary part 58 and a pivoting part 59 which pivots as the bending proceeds, the angle $a_1$ formed by the horizontal plane which is that of the glass sheet and that of the frame in the lower left corner is about 35 degrees. A slight counterbending along line 61 occurs at the beginning of the bending on glass sheet 60, as shown in FIG. 7a. During the bending, as shown in FIG. 7b, the glass sheet curves and the counterbending along line 61 is pronounced. At the end of the bending, as shown in FIG. 7c, the glass sheet exhibits a final bending with a pronounced counterbending along line 61.

In skeleton 1 according to the invention, at the beginning of the bending, as shown in FIG. 8a, the angle $a_2$ formed by glass sheet 60, i.e., the horizontal plane, and the stationary frame in the lower left corner, is only on the order of 15 degrees. At the beginning of the bending, only a slight counterbending occurs along line 62. During the bending, as shown in FIG. 8b, the glass rests on the stationary frame, and a positive curve appears along line 63.

During the final stage of the bending and at the end of the operation as shown in FIG. 8c, the glass is curved and there is no counterbending. The curve is positive along line 63.

In FIGS. 9 and 10, a variant of a frame for the bending of a glazing subject to counterbending close to its four corners has been shown. The frame here takes the essential characteristics of the frame described in relation to FIGS. 5 and 6. It comprises a stationary frame 64 formed by two longitudinal beams 65, 66 and two end crossbeams 67, 68, as well as two pivoting crossbeams 69, 70, each exhibiting two flanges 71, 72, 73, 74, mounted to pivot around four pins aligned two by two along lines of pins 75, 76, carried by the stationary frame at a level corresponding to that of the upper edge of this frame. The device differs from the preceding frame by the means causing the swinging of pivoting crossbeams 69, 70. The mounting of the frame on the carriage intended to convey the frame into the bending furnace is achieved here by two round bars 77, 78 extending crosswise and mounted to rotate freely at their ends in holes 79 provided in plates 80 surmounted by hooks 81 making possible the hooking of the frame on the carriage (not shown). The frame is connected to two bars 77, 78 by arms 82 mounted on rings 83 able to pivot around bars 77, 78. Arms 82 are attached to the flanges of the pivoting crossbeams. As in the device described above, the latter carry two rods (not shown) able to be connected by a yoke when the crossbeams are in retracted position at the beginning of the bending operation, as shown in FIG. 9. In this position, arms 82, integral with the pivoting crossbeams, are inclined relative to the vertical line. When the yoke is removed for the second bending phase, the pivoting crossbeams thus released ar subject to the action of the weight of the frame and can pivot around their pins 75, 76 at the same time as the arms pivot around two bars 77, 78 to come into a vertical position of balance.

The bending frame is then in the position shown in FIG. 10. In this variant, the weight of the frame and not the weights therefore causes the pivoting, at the desired time, of the pivoting crossbeams for the passage from the blank frame configuration to the final frame configuration.

The process and the device according to the invention advantageously apply to the bending by gravity of glass sheets subject to a counterbending.

Obviously, numerous modifications and variations of the present invention are possible in light of the above teachings. It is therefore to be understood that within the scope of the appended claims, the invention may be practice otherwise than as specifically described herein.

What is claimed as new and desired to be secured by Letters Patent of the United States is:

1. A process for gravity bending at least one glass sheet, comprising the steps of:
   placing at least one glass sheet on a substantially horizontal bending frame having at least one stationary crossbeam defining a first peripheral line and at least one corresponding pivoting crosswise part defining a second peripheral line and mounted adjacent to each said stationary crossbeam;
   raising the temperature of the at least one glass sheet so that the at least one glass sheet deforms due to gravity in a first bending step and assumes the profile of the bending frame; and
   modifying the shape of the bending frame in a second bending step until the at least one glass sheet assumes a final shape,
   wherein the first bending step comprises supporting the at least one glass sheet along the first peripheral line, and the second bending step comprises pivoting and crosswise part so as to support the at least one glass sheet along the second peripheral line, which is of a different curve from the first peripheral line, and which is substituted for the first peripheral line.

2. Process according to claim 1, wherein one of said peripheral lines is inside the other of said peripheral lines.

3. Process according to claim 1, wherein the second peripheral line comprises a modification of at least one part of the first peripheral line.

4. Process according to claim 3, wherein the modification is in the lateral parts of the first line.

5. Process according to claim 3, including the step of raising the level of at least one part of the first line to provide said modification.

6. Process according to claim 5, wherein the first and second peripheral lines are such that the angle formed by any vector tangent to said first peripheral line with a horizontal plane is about 15 degrees and any vector tangent to said second peripheral line with a horizontal plane is about 35°.

* * * * *